Patented June 5, 1923.

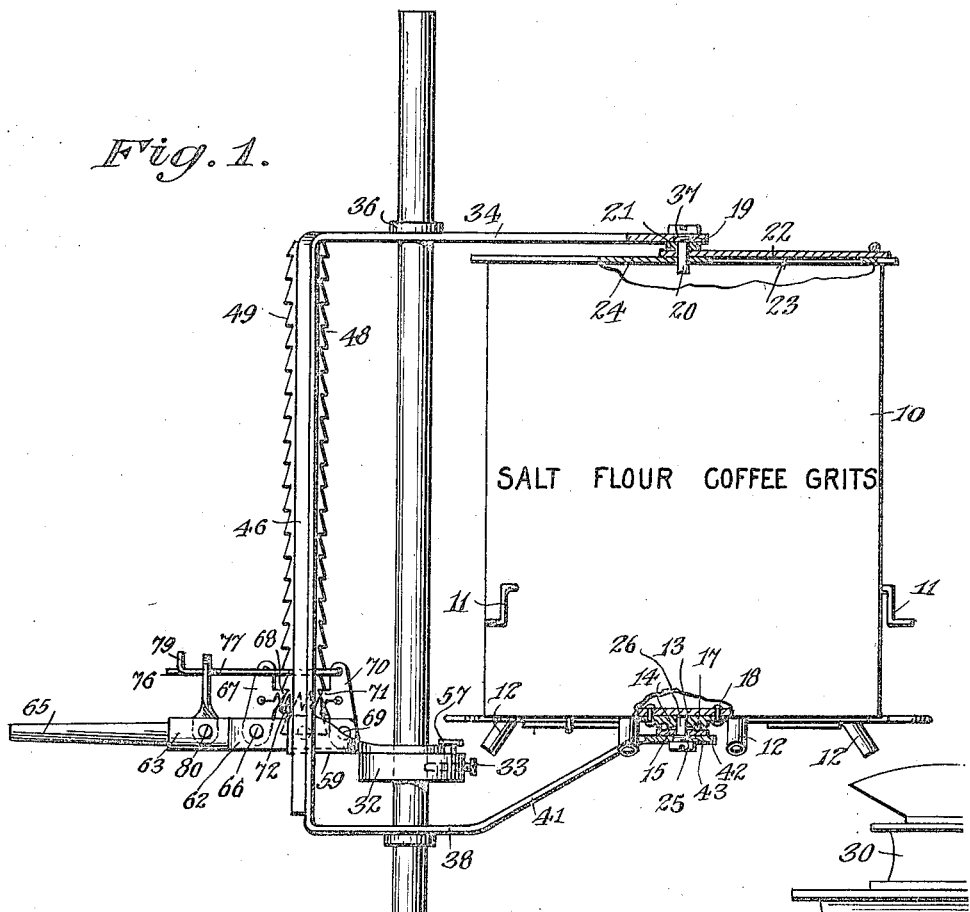

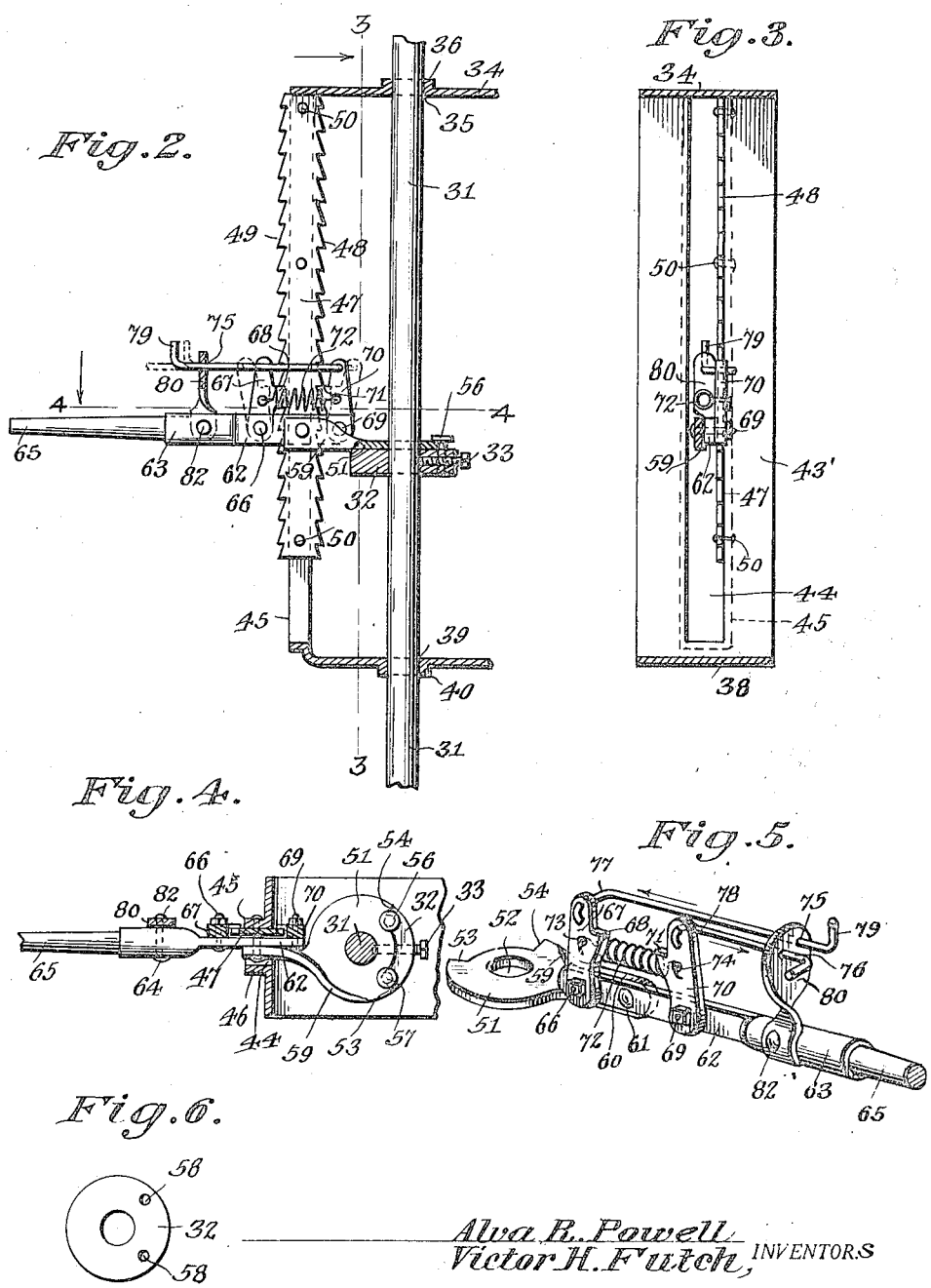

1,458,000

UNITED STATES PATENT OFFICE.

ALVA R. POWELL AND VICTOR H. FUTCH, OF NASHVILLE, GEORGIA.

DISPENSING APPARATUS.

Application filed July 6, 1922. Serial No. 573,229.

*To all whom it may concern:*

Be it known that we, ALVA R. POWELL and VICTOR H. FUTCH, citizens of the United States, residing at Nashville, in the county of Berrien and State of Georgia, have invented certain new and useful Improvements in Dispensing Apparatus, of which the following is a specification.

This invention relates to certain new and useful improvements in dispensing apparatus, of a type adapted for holding and dispensing a plurality of different kinds of dry substances or commodities, to facilitate the dispensing and weighing out of small quantities of such substance or commodities in grocery stores or the like, more particularly to improvements in the type of dispensing apparatus, as set forth in our application filed April 25, 1922, S. N. 556,514, and besides embodying the objects and advantages as set forth in said application, has for its further object to provide the apparatus, with means in a manner as hereinafter set forth whereby the bin or receptacle of the apparatus, can be expeditiously lowered for refilling from the top, and then quickly elevated, after refilling to the desired position with respect to a counter on which is arranged a scale or with respect to the scale mounted on a suitable platform.

Further objects of the invention are to provide a dispensing apparatus for the purpose set forth, which is comparatively simple in its construction and arrangement, strong, durable, convenient and efficient in its operation, readily assembled, economical in its use, and comparatively inexpensive to manufacture.

With the foregoing and other objects in view, the invention consists of the novel construction, combination and arrangement of parts, to be hereinafter more specifically described and illustrated in the accompanying drawings, wherein is shown an embodiment of the invention, but it is to be understood that changes, variations, and modifications can be resorted to, which come within the scope of the claims hereunto appended.

In the drawings wherein like reference characters denote corresponding parts throughout the several views:—

Figure 1 is a sectional elevation of a dispensing apparatus in accordance with this invention, Figure 2, is a vertical sectional view illustrating the elevating and lowering mechanism for the bin or receptacle, Figure 3 is a section on line 3—3, Figure 2, looking in the direction of the arrow, Figure 4 is a sectional plan on line 4—4, Figure 2, looking in the direction of the arrow, Figure 5 is a perspective view of the operating means of the elevating and lowering mechanism, Figure 6 is a top plan of stop collar, Figure 7 is a section on line 7—7, Figure 1, looking in the direction of the arrow.

An apparatus in accordance with this invention, includes a dispensing bin or receptacle of a construction similar to that disclosed in the application referred to, that is to say, a compartment dispensing bin, and as no claim is made herein with reference to the compartment features of the bin, such compartment features are not illustrated other than the bin 10 being provided with cranks 11 for operating the agitators within the bin 10. Discharge spouts 12 are illustrated as projecting from the bin. The differences in construction between the bin 10, illustrated in this application and that described and claimed in application #556,544, are as follows:—

The bottom 13 of the bin 10, centrally of its outer face, has a bearing plate 14, which is opposed by a bearing washer 15, and interposed between the plate 14 and washer 15 are bearing balls 17. The ball races are arranged in the opposed faces of the plate 14 and washer 15. The manner in which the washer 15 is maintained in associated position with respect to the plate 14 will be presently referred to. The hold-fast devices 18 are employed for securing the plate 14 to the bottom 13. Supported, in a manner to be presently referred to, is a vertically disposed enlarged headed screw 19 having the shank thereof as at 20, extended to provide a spindle, and which projects through the washer 21, the inner end of the closure 22 for the filling opening 23, and also through the top 24 of the bin 10. The screw 19 associates with a screw 25, which has its shank extended as at 26, providing a vertically disposed spindle and which extends through the washer 15 and plate 14 and is arranged in alinement with the spindle 20 thereby providing means around which the bin 10 can be revolved when occasion requires.

Associated with the bin 10, is a combined elevating, lowering and supporting mechanism therefor, which will be presently referred to, and said mechanism has associated therewith, a supporting element therefor and which includes a base formed with a head piece 27 secured in a pair of foot pieces 28, which are arranged in spaced relation, so as preferably to straddle the counter 29 on which is arranged the scale 30. The head piece 27 is secured in the foot pieces 28 in any suitable manner, so as to prevent separation, and fixedly connected to the head piece 27 centrally thereof, is a vertically disposed standard 31, upon which the said mechanism is supported and also vertically shifted. A stop collar 32, is adjustably secured to the standard 31, intermediate its ends, through the medium of a set screw 33, the latter is mounted in the collar 32 and is adapted to engage standard 31 to maintain the collar 32 stationary.

The combined elevating, lowering and supporting mechanism for the bin 10, includes a bracket member consisting of an upper arm 34, having an opening 35 rearwardly to one side of the center thereof, and further provided with an integral collar 36 which registers with the opening 35 and through the latter and the collar 36 extends the standard 31. The arm 34 at its forward or free end is provided with an opening 37, the wall of which is threaded and engaged by the screw 19, whereby the latter is fixedly secured to the arm 34. The bracket further comprises a lower arm 38 having an opening 39 and an integral collar 40 which registers with the latter. The opening 39 and collar 40 are arranged in alinement with the opening 35 and collar 36 and through the opening 39 and collar 40 extends the standard 31. The forward portion of the lower arm 38 is bent upwardly at an inclination as at 41, and terminates in a horizontally disposed portion 42, formed with an opening 43, the wall of which is threaded and engaged by the screw 25 whereby the latter is fixedly secured to the arm 38. The bin 10 is positioned between the arms 34, 38 forwardly of the standard and revolves between the said arms. The bracket further includes a vertically disposed arm 43′ having the rear ends of the arms 34 and 38 terminating therewith, and the said arm 43′ is positioned in close proximity to the standard 31. The arm 43′ centrally thereof, is provided with a wide vertically disposed slot 44, of a length substantially equal to the length of the arm 43′, and projecting rearwardly from the arm 43′, is a pair of vertically disposed elongated flanges 45, 46, which are flush with the side walls of the slot 44. Secured against the flange 45, and projecting forwardly and rearwardly of the slot 44, is a rack bar 47, having its forward edge toothed as at 48, and its rear edge toothed as at 49. The hold-fast devices 50 are employed for securing the rack bar 47 to the flange 45. The combined elevating, lowering and supporting mechanism further includes means which associated with the rack bar 47 and collar 32 for the purpose of elevating and lowering the bin, as well as supporting the bin, into the position to which it has been shifted and the said means further associate with the rack bar 47 to provide a stop to arrest downward movement of the bracket with respect to the said means, the said means is termed a combined lever and pawl element extended to provide a support for the bracket and further including means to limit the swinging of the bracket in either direction on the standard 3, and the said element consists of a circular disk 51 provided with an opening 52, through which extends the standard 31, and the said disk is cut away at its marginal portion to form a pair of shoulders 53, 54, which constitute stops for limiting the swinging movement of the bracket in either direction. The disk 51 is mounted on the upper face of the collar 32, and associated with the shoulders 53, 54, are stop pins 55, 56, respectively, which removably engage in pockets 58 formed in the upper face of the collar 32. When the pins 56, 57 are in the position shown in Figure 4, the disk 51 cannot shift on the collar 32, but if the pin 56 is removed, it permits of the disk 51, shifting as far as the pin 57 and if the pin 57 is removed, it permits of disk 51 shifting as far as pin 56. By this arrangement the bin 10 can be shifted to and from the counter 29 or to the scale 30 when desired. The upper face of the disk 51 is flanged as at 59, and which extends rearwardly and terminates in an arm 60, to which is pivoted as at 61, the lever arm 62, the latter projects rearwardly from the bracket arm 43′, and is formed with a sleeve 63, to which is attached, by the hold-fast device 64, a handle 65. The lever 62 projects to a point in close proximity to the disk 51 and through the slot 44 to a point in advance of the teeth 48 of the rack bar 47. Pivotally connected to the forward end of the lever 62, as at 66, is a vertically disposed pawl 67, formed with a nose 68, engaging the teeth 48. Pivotally connected to the lever 62, at a point rearwardly with respect to the connection 66, and as at 69, is a vertically disposed pawl 70, provided with a nose 71, which engages the teeth 49. The pawls 67 and 70 are oppositely disposed with respect to each other, and are connected together by a coiled spring 72, having one end as at 73 connected with the pawl 67 and its other end, as at 74 secured to the pawl 70. A releasing bar 75 associates with the pawl 67 and a releasing bar 76 associates with the pawl 70. The bar 75 has an angle shaped forward end 77, which is attached to the upper end of the pawl 67, and the bar 76 has an angle shaped forward end 78, which is attached to the upper end of the pawl 70. The bars 75 and 76 when employed to release the pawls 67 and 70 from the teeth 48, 49, are shifted in opposite directions with respect to each other, that is to say, the bar 75 is shifted forwardly in the direction of the arrow, see Figure 5, and the bar 76 rearwardly, in the direction of the arrow, also shown in Figure 5. The bars 75, 76 have angle shaped rear ends 79, to facilitate the shifting of said bars when desired. A combined support and guide is carried by the sleeve 63 for the rear end of the bars 75, 76, and which consists of a vertically disposed torsionally twisted arm 80, having openings for the passage of bars 75 and 76, and further having its lower end secured against the sleeve 63, as at 82.

When it is desired to elevate the bin, the lever 62 is oscillated on its pivot 61 causing thereby the pawls 67 and 70, to intermittently engage the teeth 48, 49, under such conditions elevating the bin to the desired position. When it is necessary to lower the bin, the outer end of the lever is elevated, at the same time the bar 76 is pulled rearwardly, then lower the rear end of the lever, at the same time pushing the bar 76 inwardly, this operation releases the pawls and allows the bracket to lower, carrying the bin therewith.

What we claim is:—

1. A dispensing apparatus comprising a standard, a vertically adjustable and swinging dispensing bin or receptacle, a supporting bracket mounted on the standard and provided with a rack bar formed with two rows of teeth, a lever and pawl mechanism supported from the standard and associated with said rack bar for elevating the bracket carrying the bin therewith.

2. A dispensing apparatus comprising a standard, a vertically adjustable and swinging dispensing bin or receptacle, a supporting bracket mounted on the standard and provided with a rack bar formed with two rows of teeth, a lever and pawl mechanism supported from the standard and associated with said rack bar for elevating the bracket carrying the bin therewith, and said mechanism including a manually operated releasable element to permit of a mounting of the bracket.

3. A dispensing apparatus comprising a standard, a vertically adjustable and swinging dispensing bin or receptacle, a supporting bracket mounted on the standard and provided with a rack bar formed with two rows of teeth, a lever and pawl mechanism supported from the standard and associated with said rack bar for elevating the bracket carrying the bin therewith, and said mechanism including a manually operated releasable element to permit of lowering of the bracket, and means carried by the standard and associated with said mechanism for limiting the swinging movement in either direction of said bracket.

4. A dispensing apparatus comprising a standard, a vertically adjustable and swinging dispensing bin or receptacle, a supporting bracket mounted on the standard and provided with a rack bar formed with two rows of teeth, a lever and pawl mechanism supported from the standard and associated with said rack bar for elevating the bracket carrying the bin therewith, and means supported from said standard and associated with said mechanism for limiting the swinging movement of the bracket in either direction.

5. In a dispensing apparatus, a standard, a vertically adjustable and swinging bracket mounted thereon, a dispensing bin extended into said bracket, a pair of opposed spindles for revolvably connecting the bin to the bracket, and means supported from the standard and associated with the bracket for vertically adjusting the latter and supporting it in adjusted position.

6. In a dispensing apparatus, a standard, a vertically adjustable and swinging bracket mounted thereon, a dispensing bin extended into said bracket, a pair of opposed spindles for revolvably connecting the bin to the bracket, and means supported from the standard and associated with the bracket for vertically adjusting the latter and supporting it in adjusted position, said means including releasable elements to permit of the lowering of the bracket.

In testimony whereof, we affix our signatures hereto.

ALVA R. POWELL.
VICTOR H. FUTCH.